United States Patent Office 2,699,414
Patented Jan. 11, 1955

2,699,414

WATER-RESISTANT GYPSUM COMPOSITION AND EMULSIONS FOR MAKING THE SAME

Rexford L. Selbe, Evanston, Ill., assignor to United States Gypsum Company, Chicago, Ill., a corporation of Illinois No Drawing. Application December 28, 1951,
Serial No. 263,980

6 Claims. (Cl. 154—45.9)

The present invention relates to improved gypsum compositions which are highly resistant to penetration by water, and more particularly to certain emulsions of waterproofing materials employed in making the said gypsum products.

It has already been proposed, for example in the patent to Thomas P. Camp No. 2,432,963, to produce highly water-resistant gypsum compositions comprising a set mass of interlaced gypsum crystals which are coated with a petroleum base asphalt containing dispersed therein minute paraffin wax particles rendering the coating substantially nonwettable by water.

The total amount of asphalt and wax in the composition usually does not exceed 15% and normally lies within the range of from 5% to 15% (dry basis) on the weight of the ultimate composition, which of course is primarily composed of calcium sulfate crystals, in other words, what is known as "set gypsum."

In accordance with the said Camp patent it was found important to keep the range of asphalt to wax within that of about 2 to 10 parts of asphalt to each part of wax, and that the most desirable water repellent effects were obtained when operating within this ratio.

The invention described in the said Camp patent has gone into very wide use, its more particular applicability being for the manufacture of so-called gypsum board sheathing which consists of a core of gypsum composition of this type with cover sheets made of heavy paper or cardboard, which may or may not additionally be rendered water repellent.

As described in the said Camp patent, the asphalt and wax are preferably incorporated with an aqueous slurry of calcium sulfate hemihydrate, while the wax and asphalt are suspended in the form of minute particles in a suitable emulsion or dispersion. In such a dispersion the asphalt and wax may form separate individual particles or the wax and asphalt may form a complex which latter is dispersed in the aqueous medium of the dispersion in the form of minute particles.

The making of emulsions for this purpose follows the usual procedure as stated in the Camp patent, of pouring molten asphalt and molten wax, separately or preblended, into an aqueous dispersion of a stabilizing agent such as solubilized alkali-soluble protein.

One of the objects of the present invention is to produce a better emulsion of enhanced value when used as an additive material to gypsum slurries for the purpose of producing highly water-resistant compositions.

Another object of the present invention is to produce set gypsum compositions which are substantially impenetrable by water or at least have a very low water absorption.

It is still a further object of the present invention to produce gypsum board having a core consisting of a highly water-resistant and substantially water nonpenetrable core composition containing wax and asphalt in certain definite proportions.

It has been found, in accordance with the present invention, that a particularly useful and highly efficacious wax-asphalt emulsion may be made by melting asphalt and wax together to form a blend and adding thereto, if desired, an oil-soluble but also water-dispersible emulsifying agent and then pouring the molten material into a solution of casein, which solution also contains an alkali sulfonate of a polyaryl-methylene condensation product as a dispersing agent.

The particular value of the addition of this material, which in order to avoid circumlocution will hereinafter be referred to as the "dispersing agent," is to obtain a finer particle size in the nonaqueous discrete disperse phase of the emulsion so that it will more uniformly blend with the slurry of gypsum and hence become more uniformly distributed therein. When such an emulsion is poured in a slurry and thoroughly blended and the slurry then cast into shape, it will set up to form calcium sulfate dihydrate with minute individual particles of the wax-asphalt blend dispersed therein into close proximity to and fairly uniformly distributed, but still in discrete form over the calcium sulfate dihydrate crystals. When such a casting, be it either in the form of blocks, cylinders, or as the core of a paper covered gypsum board, is subsequently deprived of its moisture by drying, and in the drying stages is heated to a temperature above the melting point of the wax-asphalt mixture, the latter will spread out over the calcium sulfate crystals so as to coat or encase them. Inasmuch as these crystals are more easily wetted by the hydrophobic materials, that is to say, the wax-asphalt blend, the material will run along the crystals until it reaches the points at which they intercept each other and will connect at those points to form a sort of cement or seal-coat so as to prevent access of water to the crystals.

Now, it has been found, as already fully explained in Camp Patent 2,432,963, that asphalt, particularly asphalts of petroleum origin, while miscible in all proportions with molten wax when they are themselves molten, are very poor solvents for the wax once the mixture has solidified. As a result of this, the micro-crystalline wax particles separate out in the asphalt-wax mixture as individual crystals, some of which slightly protrude from the surface of the asphalt. The over-all effect of this is to render such a blend which has been allowed to cool from the molten state substantially entirely unwettable by water. It is a known fact, and experiments to prove it are recited in the Camp patent, column 4, line 43 to column 6, line 22, that ordinary asphalt which does not contain the wax, while insoluble in water, is easily and completely wettable thereby. Paraffin wax is also wettable by water, and moreover has rather poor adherence to solids such as gypsum crystals.

Asphalt, however, clings tenaciously to gypsum crystals. Hence when the gypsum crystals are thus coated with the wax-asphalt composition which has solidified from the molten condition, these surfaces will present a negative meniscus to water.

Obviously when a gypsum casting is made, which always contains more water than is theoretically necessary for the conversion of the hemihydrate to the dihydrate (theoretically 18.4%), it follows that there will be excess water in the set product, and as this water eventually evaporates it will leave empty spaces in the form of interstices in the product.

When such a product is therefore subsequently immersed in or otherwise brought into contact with water, water will be sucked into these interstices by capillary action, even though the crystals themselves are protected against solution by the water (it being known that calcium sulfate is slightly soluble in water). However, with the crystals coated with a material which presents a negative meniscus to water there will therefore be a negative capillarity which will completely keep the water out of the composition.

While this principle has already been fully established and forms the basis of the said Camp patent, the present invention provides considerably improved results by reason of the fact that the emulsion of the wax-asphalt complex contains the dispersing agent which is more fully hereinafter described.

It has been found therefore that it is possible to attain the desired degree of low water absorption in the product by using a considerably smaller amount of the asphalt-wax complex than would otherwise be the case, or on the other hand, if the same amount was used as before, the degree of resistance to the absorption of water is greatly increased, and, in fact, may even reach a point of no absorption at all.

It will be self-evident that the attainment by inexpensive means and by relatively simple procedure of a truly water-impermeable set gypsum composition is something which has not hitherto been secured, and which has great utility in the gypsum and other building material arts.

As an example of the manner of making an improved type of asphalt-wax complex emulsion, in accordance with the present invention, the following example is given, with the understanding that it is merely exemplificative, and that the invention is not to be limited to the precise and exact quantities given as these may be varied depending upon the choice of the user and the degree of water-impermeability which is to be imparted to the gypsum composition. However, when following this formula and using the amounts hereinafter given in Table I, it will be seen that the degree of lack of water absorption or, as we might say, the resistance to absorption by water, can be brought to zero, if this should be desired.

Asphalt, preferably a petroleum base asphalt, and having softening point of about 105° F., is melted and there is then blended therewith a paraffin wax having a melting point of about 122° to 124° F. in the proportion of say 1300 pounds of asphalt to 248 pounds of the melted wax, the two materials being thoroughly stirred together so as to insure uniform blending. While still being kept molten, and preferably at a temperature which does not exceed 160° F., there are added to the wax-asphalt blend about 5¼ pounds of an oil-soluble alkali salt of mahogany sulfonic acid, this being a potential emulsifying agent. These mahogany sulfonic acids are now manufactured on a very large scale by the various petroleum refineries of the United States and are in the form of a reddish brown liquid of syrupy consistency. They are the products resulting from the treatment of petroleum stock with fuming sulfuric acid, which contains free sulfur trioxide. This treatment forms two types of sulfonic acids, one of which is water-soluble and the other of which is oil-soluble. At the end of the acid treatment two layers usually form, a lower one which contains most of the excess sulfuric acid and the water-soluble petroleum sulfonic acids; and an upper layer, usually termed the "acidified oil" containing the oil-soluble sulfonic reaction products. While still being contained in the oil, they are neutralized with an alkali, such as sodium hydroxide, to form the sodium salts which, however, are still soluble in the oil, from which they are removed by distillation. It is these oil-soluble sulfonates which are the material added to the asphalt-wax complex. The empirical formula of this type of petroleum sulfonate is $C_nH_{2n}$—10 $SO_3Na$ in which "$n$" may range from any number between 20 and 30.

After the asphalt-wax mixture containing the just mentioned sulfonate has been made, it is kept at a temperature of about 165° to 175° F. so as to keep it freely fluid.

In the meantime, and in another vessel there has been prepared a casein solution which may have approximately the following composition:

| | | |
|---|---|---|
| Casein | pounds | 232 |
| Gum arabic | do | 31 |
| Potassium hydroxide | do | 7 |
| (Or sodium hydroxide 5 pounds) | | |
| Sodium oxalate | do | 34 |
| Borax | do | 42 |
| Ortho Cresol | do | 50 |
| Water | gallons | 150 |

These materials are heated to a maximum temperature of 170° F. during a time period of from 30 to 40 minutes to attain the temperature, and then are maintained at between 170° and 180° F. for about 35 minutes, care being taken not to exceed 185° F. At the end of this cooking period the ortho cresol is added; this serves merely as a preservative. This casein solution is employed in the making of the final emulsion. This is done as follows:

Twenty gallons of the casein solution made as hereinabove described are placed in a suitable vessel, whereafter this solution is agitated and there is gradually added in small increments the hot asphalt-wax complex. As a result of the agitation the complex will become dispersed in the form of minute particles. It is necessary to do this in small increments so as to obtain a good emulsion. After all the asphalt-wax complex has been introduced an additional 100 gallons of water are added at the rate of about 10 to 15 gallons per minute. This water is at a temperature between 110° to 120° F. so that the final mixture or emulsion will have a temperature of about 140° F. There are then added 92 gallons or more of water and also a solution of 28 pounds of the dispersing agent in 20 gallons of water, and the agitation continued for fifteen more minutes. The dispersing agent insures the stability of the emulsion and also further subdivides the particles so that the average particle size in the emulsion does not exceed about four microns with not more than about 2% thereof in aggregates larger than 10 microns. This is important because this small particle size of the emulsion is a factor in assuring the more uniform distribution of the asphalt-wax complex in the slurry during the formation of the gypsum products as hereinafter described.

The dispersing agent preferably consists of a sodium salt of a naphthalene sulfonic acid which has been condensed with formaldehyde to form the polyaryl-polymethylene sodium sulfonate. A particularly efficacious form of this is one having a structural formula involving three naphthalene monosulfonate groups in which the $SO_3Na$ groups are in the beta position in the naphthalene nucleus, there also being two linking methylene ($CH_2$) groups attached to the other beta position on the naphthalene nucleus. The probable structural formula of this type of composition is as follows:

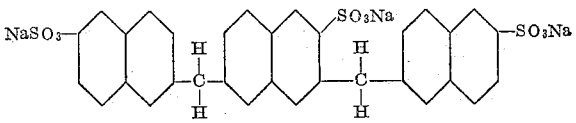

"Tamol" N which is a similar product, may be substituted for the above material, or one may use a neutral sodium salt resulting from the sulfonation of lignocellulosic paper makers' waste, this material being commercially available under the trade mark "Marasperse." The latter material also undoubtedly contains aryl groups, as it is well known that the lignin extracts from lignocellulose, particularly by the sulfite process, contains phenolic groups, which are properly designated generically as aryl groups.

Having produced the emulsion as hereinabove described it may then be employed, for instance, for the making of a gypsum core plasterboard which, by reason of its water resistance, may be used as a sheathing. This may be done on any of the well known types of machines for the making of plasterboard, such as are exemplified by the patents to Utzman 1,330,413, Pfeffer 1,758,200, Gough et al. 1,767,791, Birdsey 1,870,439, Gough 1,915,603, or the methods described in the patents to Roos 2,017,022, 2,044,401, 2,079,338, 2,080,009, and Camp Patent 2,207,339. As described in these patents, numerous other additive materials may be incorporated with gypsum slurry such, for example, as tenacious foam to render it cellular or various types of adhesives to assure a better bond between the paper core material and the cover sheets; hence it is not deemed necessary to describe in detail how such plasterboard is made as the industry and the art into which the present invention falls are thoroughly and fully conversant therewith.

The one particular additive material, however, is the presently described special type of emulsion. The amount employed may be on the order of from 10 to 17 gallons of the emulsion for every 1000 square feet of ½" sheathing board.

As the average weight of 1000 square feet of this board is about 2055 pounds, the percentage can readily be calculated. In any event the amount of asphalt-wax complex in the board ranges between about 5 to 15% of the weight of the core portion of the board.

The manipulative details of making the board are in no way altered by using the emulsion of the present invention, and the drying of the board is accomplished as usual. During the drying, however, the temperature of the board must be brought to at least, or preferably somewhat above, the melting point of the asphalt-wax mixture which is approximately 110° F., because, as already mentioned, it is quite essential that the material be molten and then allowed to coat the crystals, and then to cool down so that the segregation of the paraffin crystals in the asphalt matrix will be formed so as to produce the desired relative capillarity.

As examples of the degree of water resistance which may be attained even by using as little as 15 gallons of the emulsion per 1000 square feet of ½" sheathing board it may be stated that such a board will absorb no water at all even when immersed for twenty-four hours in water.

Of course the paper cover sheets will absorb some water, but this can be minimized by treating the paper prior to its application to the board with a form of petroleum jelly, for example as described in Camp Patent 2,560,521. It is also possible instead of following the Camp Patent 2,432,963, to use the improvements thereon as set forth in Camp Patent 2,526,537 in which a small amount of potassium sulfate is used in the slurry, or in accordance with Camp Patent 2,526,538, in which a small amount of alkali or alkaline earth aluminates or Portland cement are added further to enhance the waterproofing effect of the asphalt-wax complex. However, by the aid of the present invention, and particularly by virtue of the presence of the mahogany sulfonate and the dispersing agent, a much higher degree of resistance to water is attained. In proof whereof the following experiments were made, using the equivalent of 12.6 gallons of emulsion per 1000 square feet of ½" board, making up enough of the core composition and casting it into cylinders 2" in diameter and 4" long.

Emulsions were made up exactly as described omitting the dispersing agent and then some were made varying the amounts of the dispersing agent and ascertaining the degree of water-absorption, and therefore to determine the degree of resistance to absorption obtainable by the practice of the present invention.

Making a mixture of ordinary calcined stucco to obtain a cylinder which when dry would weigh 1800 grams, it was found necessary to employ 1600 grams of such stucco, which is a commercial form of calcium sulfate hemihydrate.

The amount of water required to be mixed therewith is given in the following table from which it will also be noticed that the addition of the dispersing agent enabled the use of somewhat less water; in other words, the dispersing agent decreases the so-called "consistency" of the gypsum water slurry.

Table I

| Reagent | Water Required per 1,600 gsm. stucco | 24 hrs. water absorption |
|---|---|---|
| | Ml. | Percent |
| 4% naphthalene formaldehyde sulfonate | 1,136 | none |
| 2% naphthalene formaldehyde sulfonate | 1,136 | none |
| 1% naphthalene formaldehyde sulfonate | 1,136 | 1.8 |
| 0.5% naphthalene formaldehyde sulfonate | 1,136 | 10.7 |
| 2% "Tamol" N | 1,136 | 1.2 |
| 1% "Tamol" N | 1,136 | 8.8 |
| Blank | 1,186 | 21.7 |

It will thus be seen that by increasing the amount of dispersing agent to 2% that zero water absorption is attainable, whereas without the dispersing agent the water absorption in 24 hours is 21.7%. It will be seen that this is a quite unexpected result.

Table II

To show the effects of the use of varying amounts of the asphalt emulsion both with and without various dispersing agents and varying the number of gallons per 1000 square feet, the following results were obtained:

| Equivalent Emulsion in gals., M sq. ft. ½" board | Gallons | | | | |
|---|---|---|---|---|---|
| | 11.2 | 12.6 | 13.9 | 15.1 | 16.4 |
| | Percent | Percent | Percent | Percent | Percent |
| No dispersing agent | | 32 | 15.2 | 9.0 | 3.0 |
| 1% Naphthalene formaldehyde sulfonic acid sodium salt | 11.9 | 5.3 | 2.4 | | |

For large scale operations so as to produce a commercially acceptable board it is preferred to use between 14 and 18 gallons of an emulsion made as hereinabove described for every 1000 square feet of ½" board.

While casein has been described in the formation of the stabilizing solution, it will be evident to chemists that other alkali-soluble proteins, such as those derived from soy beans, peanuts, and the like, may be used in place of the casein.

It will, moreover, be self-evident that all of the added ingredients, except the water, will of course remain within the finished product, so it is difficult to ascribe the effect of any one particular ingredient, but the empirical fact remains that when practicing the present invention, 0% of water absorption is attainable, and whether the various ingredients are sinergistic to each other is a matter of speculation. Undoubtedly the casein asserts some influence on the strength of the product although not contributing to the resistance to water absorption. The main effect of negative capillarity is attributable primarily to the asphalt-wax complex and the reason why a better result is obtained with the present invention is probably attributable to the finer and more stable emulsion which resists breaking during the drying of the set gypsum material until just before the last of the water evaporates, so that the particles will deposit themselves on the gypsum crystals, will quickly melt, run together, and hence form the desired water-repellent negative meniscus coating.

If desired there may also be introduced into the eventual emulsion of the asphalt-wax casein, etc., complex, 4½ gallons of so-called "Vinsol" emulsion containing about 40% solids of actual Vinsol, which latter material is the residue of the distillation of rosin and is an acidic, dark, almost black, but clear resin. The invention, however, is not to be circumscribed by the presence of this particular material as it will be operative without it. However, the Vinsol is a protective agent which still further enhances the stability of the asphalt-wax complex emulsion, as when it is to be stored for considerable time or perhaps shipped in tank cars, the addition of the Vinsol in the emulsion has been found to be useful.

Though the above description is given purely for purposes of example, it is not intended to limit the present invention to such specific embodiments, for obviously the principles underlying the present invention may be applied to materials other than plasterboard or sheathing board, and still be within the scope and spirit of the present invention as defined by the hereunto appended claims.

I claim:

1. An emulsion suitable for waterproofing cementitious materials by incorporation therewith while still in an aqueous slurry stage comprising a blend of oil-soluble alkali salts of mahogany sulfonic acid with asphalt and paraffin wax, the latter two in the proportion of from 2:1 to 10:1, dispersed in an aqueous solution of an alkalinized water-soluble protein and containing from about 0.5% to about 4% of the trisodium salt of a trinaphthalene-dimethylene trisulfonic acid.

2. An emulsion suitable for waterproofing cementitious materials by incorporation therewith while still in an aqueous slurry stage comprising a blend of oil-soluble alkali salts of mahogany sulfonic acid with asphalt and paraffin wax, the latter two in the proportion of from 2:1 to 10:1, dispersed in an aqueous solution of an alkalinized water-soluble protein, and containing from about 0.5% to about 4% of a compound having the formula

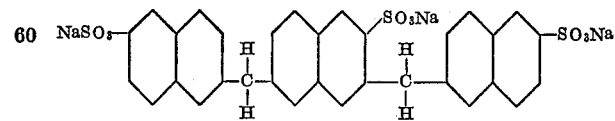

3. A water-resistant gypsum composition comprising a set mass of interlaced gypsum crystals that are coated with a petroleum base asphalt containing dispersed therein minute paraffin wax particles rendering the coating substantially non-wettable by water, the total amount of said asphalt and wax not exceeding about 15% by weight thereof, the ratio of asphalt and wax being within the range of from about 2 to about 10 parts of asphalt to each part of wax, an alkalinized water-insoluble protein and also a small amount on the order of from about 0.5% to about 4% of the trisodium salt of a trinaphthalene-dimethylene trisulfonic acid.

4. A water-resistant gypsum composition comprising a set mass of interlaced gypsum crystals that are coated with a petroleum base asphalt containing dispersed therein minute paraffin wax particles rendering the coating substantially non-wettable by water, the total amount of said asphalt and wax not exceeding about 15% by weight thereof, the ratio of asphalt and wax being within the range of from about 2 to about 10 parts of asphalt to each part of wax, an alkalinized water-insoluble protein and also a small amount on the order of from about 0.5% to about 4% of a compound having the formula

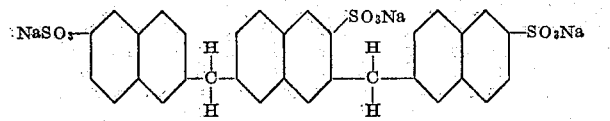

5. A water-resistant paper-covered sheathing board having a core consisting of the composition as defined in claim 3.

6. A water-resistant paper-covered sheathing board having a core consisting of the composition as defined in claim 4.

References Cited in the file of this patent
UNITED STATES PATENTS

| | | |
|---|---|---|
| 2,172,392 | Kress | Sept. 12, 1939 |
| 2,432,963 | Camp | Dec. 16, 1947 |
| 2,464,759 | Camp | Mar. 15, 1949 |
| 2,526,538 | Camp | Oct. 17, 1950 |
| 2,597,901 | Riddell et al. | May 27, 1952 |